Jan. 8, 1924.
W. WAGNER
1,479,881
AUTOMATIC PROPORTIONATE FEED CONTROL
Filed March 11, 1920   2 Sheets-Sheet 1
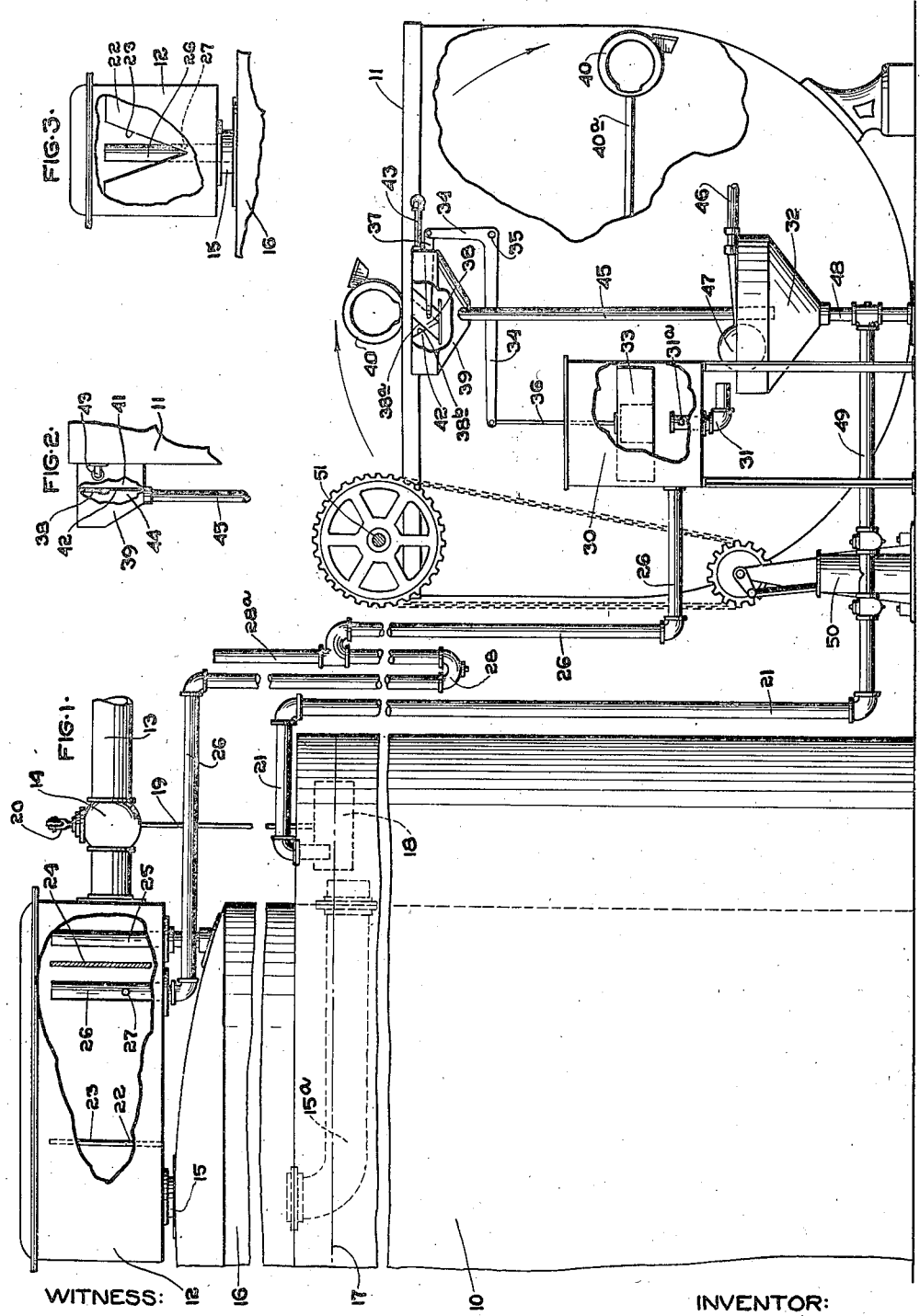
WITNESS:
INVENTOR:
WALTER WAGNER
BY
ATTORNEYS

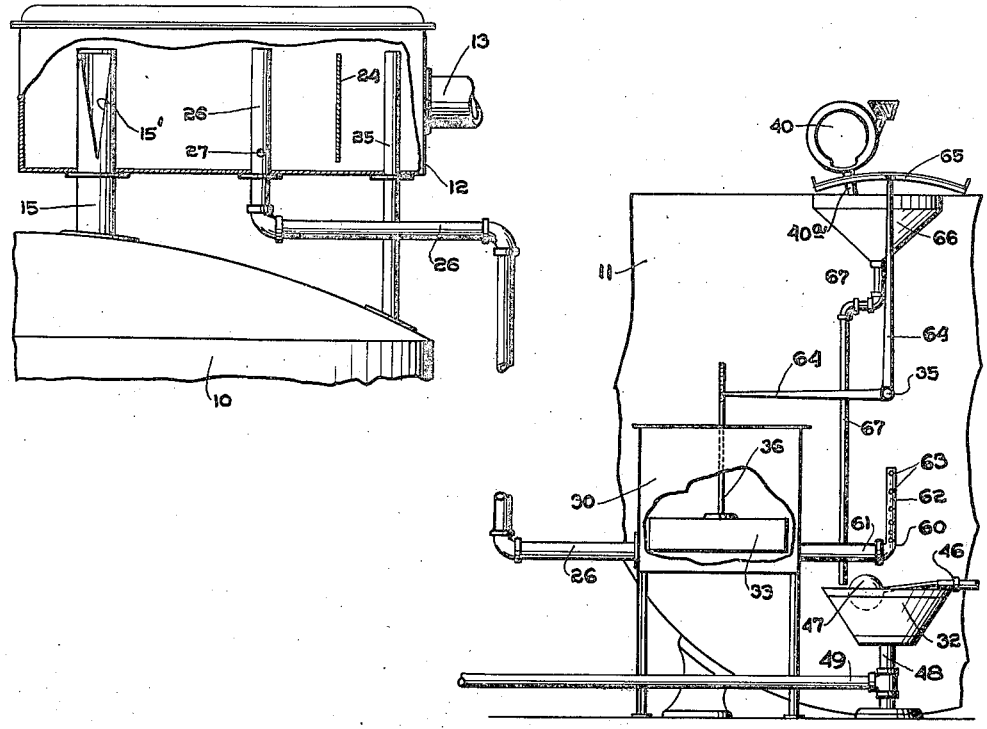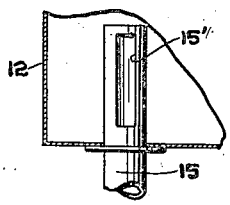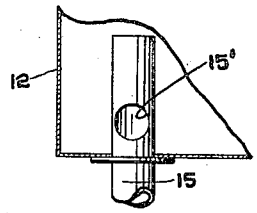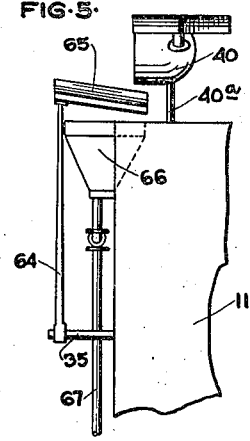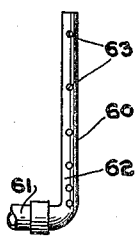

Patented Jan. 8, 1924.

1,479,881

UNITED STATES PATENT OFFICE.

WALTER WAGNER, OF BERWYN, ILLINOIS, ASSIGNOR TO INTERNATIONAL FILTER CO., OF CHICAGO, ILLINOIS, A CORPORATION OF ILLINOIS.

AUTOMATIC PROPORTIONATE FEED CONTROL.

Application filed March 11, 1920. Serial No. 364,986.

*To all whom it may concern:*

Be it known that I, WALTER WAGNER, a citizen of the United States, residing at Berwyn, in the county of Cook and State of Illinois, have invented certain new and useful Improvements in Automatic Proportionate Feed Controls, of which the following is a specification.

The present invention relates to improved apparatus for regulating reagent feed, and specifically to a hydraulic link and mechanism associated therewith by means of which the quantity of chemical solution employed in water purification and softening systems is automatically proportioned with respect to the varying quantity of raw water introduced for treatment.

The installation and maintenance of present types of automatic proportional control devices is not a difficult problem where the chemical tank may be positioned in close proximity to the treatment tank, but in cases where the distance between these tanks and the difference in level is great it is found impractical to bridge the space by the usual means of mechanical link or chain and pulley contrivance heretofore employed in regulating the flow of chemical solution. My invention, therefore, it may be noted has for its chief object the provision of efficient means whereby accurate and reliable chemical solution supply is accomplished under all conditions of installation and use.

A more particular object of the invention is the provision of mechanism for regulating the feed of a treating material to a liquid to be treated, which mechanism is susceptible of continuous operation concomitantly with supply of the treated liquid, whereby the apparatus may be operated continuously, and without the necessity of resetting.

Another object is the provision of apparatus which will operate automatically to vary the proportion of treating material to treated liquid in predetermined amounts upon predetermined variations in the quantity of treated liquid supplied.

In order that the invention may be readily understood, I have illustrated two embodiments of the same in the accompanying drawings which form the basis upon which the following detailed description is predicated.

It is to be understood that the invention may be embodied in other constructional forms, wherefore the drawings and description are to be taken as illustrative only and not in an unnecessarily limiting sense.

In the drawings:—

Fig. 1 is an assembly view in side elevation of one embodiment of the invention with certain portions broken away to reveal interior mechanism.

Fig. 2 is a fragmentary view of the chemical tank and the constant-level weir tank associated therewith, at right angles to that shown in Fig. 1, Fig. 3 is an elevation of the upper weir box, at right angles to that shown in Fig. 1, Fig. 4 is a side elevation of the operative parts of another embodiment of the invention, Fig. 5 is a fragmentary view of the chemical tank and the chemical measuring tank associated therewith, at right angles to that shown in Fig. 4, Figs. 6 and 7 are modifications of the discharge opening as shown in Fig. 4, Fig. 8 is an enlarged detail of the modulating device as shown in Fig. 4.

With reference especially to the embodiment shown in Figs. 1, 2 and 3, the numeral 10 designates a water treatment tank of usual construction, cooperatively connected with a chemical solution tank 11. Mounted above the water treatment tank 10 is a weir or head box 12, optionally covered, into which untreated water flows from an intake pipe 13, being subsequently discharged therefrom through the pipe 15, heater 16 and pipe 15$^a$ into the treatment tank 10 when hot treatment is desired, or the heater may be eliminated and the flow be direct from the weir box to the treatment tank through the pipes 15, 15$^a$.

A constant water level, indicated by the line 17 is maintained in tank 10 by means of a float 18, which operates, through the connecting rod 19 and lever arm 20, a shut off valve 14 in the intake pipe 13. A pipe 21, which discharges the chemical solution into tank 10 at a point adjacent the discharge of water from pipe 15$^a$, leads from the chemical tank 11 by connections hereinafter more fully explained.

The weir box 12, which may be of any desired shape, has located at one end thereof the water inlet pipe 13, while in the bottom of the box at the other end is the water outlet 15 leading to the treatment tank, or in the case of hot water treatment, to the heater. A weir partition 22 extends across the weir box, and is provided with a V-shaped opening 23 through which the water flows in leaving said weir box. A baffle plate 24, placed across the box near the opening of intake pipe 13, tends to lessen the agitation in the water as it enters through pipe 13. A pressure equalizing pipe 25, having its upper end open, serves to maintain equal air pressure in the heater and weir box. Located between the baffle and V-notch partition is a vertical pipe 26, in the side of which and at the level of the bottom of the V-notch 23 is provided a small opening or control orifice 27.

The pipe 26 passes through the bottom of the weir box and extends over and down the side of the treatment tank where it is shown as containing a pressure compensating water seal 28, the latter including an open stand pipe $28^a$. The water seal may be omitted but it will be found advantageous in a hot treatment system to dispose of fluctuating pressure conditions in the weir box due to the action of the heater 16. Below the water seal the pipe 26 continues downwardly and discharges into the float control pot 30. Protruding vertically from the bottom of said pot is a short pipe 31, having a closed upper end, and containing in its side a small orifice $31^a$ of the same cross sectional area as the orifice 27 in pipe 26.

Pipe 31 discharges into a pump suction box 32. A float 33 in the float control pot 30 is connected by means of a link 36 to bell crank lever 34 which latter is pivoted to the side of the chemical tank on the stub shaft 35. The upper arm of said bell crank lever is connected, by means of a link 37, to a slide 38. Said slide has an oblique edge $38^a$, which controls the effective size of a V-notch opening $38^b$, disposed in the upper part of a weir partition 42 which extends across the collector box 39. This collector box is preferably formed with a conical bottom.

A plurality of discharge cups 40, rigidly attached to the outer ends of radial spokes $40^a$, rotate in a vertical plane in the chemical tank 11, scoop up the chemical solution in said tank, and, as they pass through the highest portion of their orbit discharge the solution over compartment 41 of the collector box 39, as shown in Figs. 1 and 2.

The compartments 41 and 44 are formed in said collector box 39 by weir partition 42. Chemical solution is supplied to compartment 41 in greater quantities than are drawn off through the V-notch $38^b$, wherefore an overflow pipe 43 is provided near the top of compartment 41 to carry the excess solution back into tank 11. The compartment 44, preferably tapered at its base, is connected to a vertical pipe 45 which discharges into the pump suction box 32. A pipe 46 constituting the inlet for make up water for the pump suction box also discharges into said box. Said pipe is equipped with a float control valve 47 which automatically maintains a constant level of liquid in suction box 32. At the base of said suction box is a vertical drain pipe 48 leading to a horizontal pipe 49 which enters a pump 50 of any approved type. To the discharge side of said pump is connected the heretofore mentioned chemical solution pipe 21 which carries the solution to the the top of tank 10. Shaft 51 is a power source by which pump 50 and the internal mechanism of the chemical solution tank may be operated.

It will be understood that in operation the rate at which treated water is drawn off from tank 10 fluctuates considerably, and in order to maintain a constant water level in the tank, the float 18, valve 14, and connecting parts are to correspondingly control the quantity of water entering through intake pipe 13. In order to properly treat the raw water entering the tank 10, it is imperative that the flow of chemical solution into said tank be so regulated as at all times to discharge into said tank in a constant ratio to the volume of incoming untreated water. This is accomplished through the present invention.

In operation, raw water enters the weir box 12, passes under the baffle 24, and upon reaching the level of the V-notch 23 in partition 22 flows therethrough into the heater or treatment tank as the case may be. The orifice 27 in pipe 26 is so located, as to height above the bottom of the weir box, that as long as water does not flow over the V-notch 23 no water may flow through the orifice 27 into the pipe 26, but as the level of the water in the weir box rises, due to the automatic opening of the valve 14, water flows through said notch into the heater, or directly into the tank 10, and a small quantity also flows simultaneously through the control orifice 27 into pipe 26, and, after passing through the water seal 28 continues down and empties into pot 30. In pot 30 the level of the water rises until it reaches the level of the orifice in the side of pipe 31, through which orifice the water flows from pot 30 into the suction box 32.

Inasmuch as the orifices 27 and $31^a$ are of the same size, water will flow as fast through the orifice $31^a$ in leaving pot 30, as through orifice 27 in entering said pot, but this condition changes when a head of water is built up above the orifice 27 due to wider opening of the valve 14. As the weir box 12 functions to provide a head of water varying with the flow of liquid therethrough, it may be and is referred to in certain of the claims as a "head box."

The increase in head above the orifice 27 increases the pressure upon the orifice, and, in consequence, the speed of flow of the water passing through said orifice. It will be readily seen that the water under these conditions is now flowing into the pot faster than it is discharging therefrom. As a result of this difference in the rate at which water enters and leaves pot 30, a head of water is built up above the orifice $31^a$ until it exerts a pressure equal to that exerted above the orifice 27, under which condition water flows into and out of pot 30 at a constant speed and will continue so to flow as long as the head of water above orifice 27 is equivalent to that above the orifice $31^a$.

If, for a period, a lesser quantity of water is admitted through valve 14, the head above orifice 27 will diminish, thereby retarding the rate of flow into pot 30, without however decreasing the discharge through the orifice $31^a$. Consequently, the head of water in pot 30 is reduced until the pressure above orifice $31^a$ becomes equal to that above orifice 27, when the rate of flow into and out of the pot 30 is again the same. In this manner the depth of the water in pot 30 automatically assumes that of the water in the weir box, and as the depth of said water in weir box fluctuates the depth in pot 30 fluctuates accordingly.

The float 33 in pot 30 moves upwardly or downwardly as the depth of water in said pot increases or decreases. This float, through the medium of the link 36, bell crank lever 34 and link 37, operates the slide 38 of the V-notch opening in box 39, thus regulating the quantity of chemical solution flowing from compartment 41 into compartment 44 of the collector box 39.

Pipe 45 discharges the chemical solution from compartment 44 into the pump suction box 32, at which point this solution, together with water from the pipes 31 and 46, is directed through pipes 48 and 49 into the pump 50, and then forced through pipe 21 to the top of tank 10, where it is discharged into the raw water to be treated therein, which has entered the tank from the weir box.

Any fluctuation in the amount of water entering the treatment tank 10 reflects a change in the depth of water in the weir box 12. This change is duplicated in pot 30, causing float 33 to move upwardly or downwardly accordingly, and a corresponding movement of the slide 38 to adjust the size of V-notch opening in the collector box 39. The elements included in the line for transmitting liquid from the inlet 27 to the discharge end of pipe 31 constitute, therefore, a hydraulic link whereby the variations in volume of the liquid supplied for treatment are rendered effective to accomplish desired variation in the quantity of treating material supplied for the treatment of the liquid. The quantity of chemical solution fed to the treatment tank is thus always in proportion to the quantity of raw water entering to be treated.

With particular reference to the embodiment as exemplified in Figs. 4 to 8 inclusive, the numerals 10 and 11 again designate respectively a water treatment tank and a chemical solution tank. Mounted above the treatment tank 10 is the weir box 12 which is in many ways similar to the weir box of Fig. 1. Box 12 has in one end an intake pipe 13. Protruding vertically from the bottom of the box is a weir in the form of a pipe 15 leading to the treatment tank. Said pipe is open at its upper end and has in its side an opening 15′, either a V-notch as shown in Fig. 4, or rectangular or circular as shown in Figs. 6 and 7 respectively. Through this opening the water flows from the weir box. As in Fig. 1 a baffle 24 and a pressure equalizing pipe 25 are disposed in the weir box. An open-ended, vertical pipe 26 extends upwardly within the weir box and has a small orifice 27 in its side a short distance above the bottom of the box and at the level of the bottom of the outflow opening in pipe 15.

Near the side of the chemical tank 11 is the float control pot 30 into which the pipe 26 discharges. Said pot is similar to that of Fig. 1, but instead of having a circular orifice outlet as in pipe 31 of Fig. 1, the pot 30 in Fig. 4 is equipped with a modulating device 60 which includes a horizontal pipe 61 disposed in the side of pot 30 near the bottom thereof. One end of pipe 61 opens into pot 30 while the other end connects in an elbow joint to a vertical open-ended pipe 62. Said pipe has small holes 63 empirically spaced up its side. Situated beneath the modulating device 60 is the pump suction box 32. A float 33 is positioned within the float control pot 30 and is connected by a link 36 to the lower arm of a bell crank lever 64 which lever is pivotally supported on the stub shaft 35 at the side of the chemical tank 11. The upper arm of said lever has rigidly attached thereto a segment shield 65. This shield extends over the rim of the chemical tank and slopes inwardly and downwardly to return excess solution from the cups to the chemical tank. Immediately beneath said shield is located a collector box 66, at the base of which is a draw-off pipe 67 which discharges to the pump suction box 32 which is identical with that shown in Fig. 1.

As in Fig. 1, the chemical collector cups 40, rigidly attached to their spokes, revolve in the chemical tank 11, pick up the solution, and as they reach their highest point of travel discharge into the collector box. The shield 65 being however interposed between the cups 40 and the collector box 66, deflects a portion or all of the discharged solution back into the chemical tank 11. The amount of chemical solution entering the box 66 depends upon the height of water in the float control box 30, since float 33 actuates the bell crank lever and thus imparts movement to shield 65. Movement of the shield determines the size of the receiving opening in the collector box, this being represented by the portion thereof not covered by the shield. The collector cups 40 are of the type which discharge uniformly through their highest arc of travel.

In the operation of this embodiment water enters their weir box 12 through pipe 13, and, passing through the opening 15' of the pipe 15 enters the treatment system. As in the embodiment in Fig. 1 a small quantity of the water passes through the orifice 27 in pipe 26 and subsequently enters the float control pot 30. Here the water rises in the pot and in the modulating device until the depth of water therein is such that the aggregate discharging capacity of the holes in the vertical pipe of the modulating device due to their respective heads is equal to the flow into pot 30, under which condition the level of the water in pot 30 remains constant, and will so continue as long as the flow of water into the system is constant. Thus the float 33 in the pot 30 determines the proportion of chemical entering the collector box 38, through the medium of the shield 65.

As the flow of water entering the system through the opening 15' becomes greater the height of water above the bottom of said opening increases, and inasmuch as the height of water above the orifice 27 increases accordingly, water flows with greater velocity through said orifice and into the float control pot 30. This water rises quickly in the pot 30 and modulating device 60 until an added number of holes in the modulating device are discharging a quantity sufficient to maintain a new constant level.

If on the other hand, the flow of water into the treatment system decreases, the velocity of the water passing through orifice 27 will diminish with the decrease in height of water above it, and since a lesser quantity of water is now entering the pot 30, the level therein will quickly fall until those holes of the modulating device in operation are discharging water only as fast as it is entering the pot and modulating device through the pipe 26.

The holes in the modulating device may be of such size and so spaced as to vary the height of water in pot 30 in any desired proportion to the flow of water into the system through opening 15', whereby to control the feed of chemical by the volume of flow into the treatment tank rather than by the head in the weir box.

It is to be understood that different forms of openings in pipe 15 require different size and spacing of the holes in the modulating device as the flow of water through different shaped openings is in different ratios to the head of water above the same according to well known hydraulic principles and formulæ. The modulation device causes an almost immediate response in the float pot 30 to changes in the amount of water entering the system.

In the first embodiment herein described a modulating device of this type may be employed as a discharge in place of the orifice 31$^a$, provided such modulating device is properly perforated to compensate in the same manner as the orifice replaced.

The modulating device may be employed in the weir box 12 in place of the orifice 27 in which case a single orifice such as 31$^a$ (Fig. 1) may be employed in the float control pot.

While I have illustrated and described a weir box in the system as the means for maintaining a head which will correspond to the rate or volume of flow to the treatment tank, it will be understood that equivalent devices may be employed at a suitable point in the system and perform a similar function, that is to say reacting to changes in flow of water for treatment and transmitting such variations by way of the hydraulic link to the chemical feeding mechanism.

I claim:

1. In apparatus of the class described, the combination of a treating receptacle, feeding mechanism for supplying treating material to said receptacle, means for supplying liquid for treatment in said receptacle, means for selecting a constant proportion of the supplied liquid, a hydraulic link accommodating continuous discharge of such selected liquid and mechanism responsive to increases and decreases in the head of liquid in said link for varying operation of the feeding mechanism.

2. In apparatus of the class described, the combination of means for supplying liquid for treatment, continuously effective dosing means for governing supply of treating material to such liquid, means for selecting a constant proportion of the supplied liquid, a hydraulic link accommodating continuous transmission of such selected proportion, and mechanism responsive to variations in quantity of liquid in said link for varying operation of the dosing means.

3. In apparatus of the class described, a combination comprising a treating receptacle, means for supplying water and chemical thereto, a float control pot having an inlet and an outlet adapted to accommodate continuous flow of water into and out of the same, a float operable by water in the control pot and effective to vary the feed of chemical to the receptacle, and means for introducing water into the control pot in constant proportion to the supply thereof to the receptacle.

4. In a device of the character described, a treatment tank, a head box connected to the supply line of liquid to be treated, a chemical supply, mechanism for feeding chemical therefrom to the treatment tank, a pot, a float therein operatively connected to the chemical feeding mechanism, and a pipe having an inlet from the head box and discharging into the pot, and the pot being provided with a continuously effective outlet.

5. In a device of the character described, a treatment tank, a weir box for reception of liquid supplied to the tank, a chemical supply, mechanism for feeding chemical therefrom to the treatment tank, a pot at a level lower than the weir box, a float therein operatively connected to the chemical feeding mechanism, and a pipe having an inlet from the weir box at substantially the level of the weir and discharging into the pot, the pot being provided with an outlet effective during supply of liquid to the pot from the weir box.

6. In a device of the character described, a treatment tank, a weir box for gauging the supply of liquid thereto, a chemical supply, mechanism for feeding chemical therefrom to the treatment tank, a pot, a float therein operatively connected to the chemical feeding mechanism, a hydraulic link effective on the float and comprising a pipe having an inlet from the weir box at substantially the level of the weir and discharging into the pot, and a modulating device effective upon predetermined conditions to vary the rate of outflow from the pot.

7. In a device of the character described, a treatment tank, a dividing box for transmitting liquid thereto, a chemical supply, mechanism for feeding chemical therefrom to the treatment tank, a pot, a float therein operatively connected to the chemical feeding mechanism, a pipe having an inlet from the dividing box and discharging into the pot, the latter being provided with an outlet and the pipe being provided with a water seal.

8. In a device of the character described, a treatment tank, a weir box for supplying liquid thereto, a chemical supply, mechanism for feeding chemical therefrom to the treatment tank, a pot at a level lower than the weir box, a float therein operatively connected to the chemical feeding mechanism, a hydraulic link acting on the float and comprising a pipe having an inlet from the weir box at substantially the level of the weir and discharging into the pot, the latter being provided with outlet and there being a water seal interposed in said link.

9. In a device of the character described, a treatment tank, a weir box for supplying liquid thereto, a chemical supply, mechanism for feeding chemical therefrom to the treatment tank, a pot, a float therein operatively connected to the chemical feeding mechanism, and a hydraulic link acting on the float and comprising a pipe having an inlet from the weir box at substantially the level of the weir and discharging into the pot, the latter being provided with an outflow including a plurality of vertically spaced orifices.

10. In a device of the character described, a treatment tank, a heating tank, a discharge passage from the heating tank to the treatment tank, a weir box for supplying liquid to the heating tank the same being sealed, a chemical supply, mechanism for feeding chemical therefrom to the treatment tank, a pot at a lower level than the weir box, a float in the pot operatively connected to the chemical feeding mechanism, a hydraulic link acting on the float comprising a pipe having an inlet from the weir box at substantially the level of the weir and discharging into the feed control pot, the latter being provided with outlet and a water seal interposed in said link.

11. In a device of the character described, a treatment tank, a heating tank, a discharge passage from the heating tank to the treatment tank, a weir box for supplying liquid to the heating tank the same being sealed, a chemical supply, mechanism for feeding chemical therefrom to the treatment tank, a pot disposed at a lower level than the weir box, a float in the pot operatively connected to the chemical feeding mechanism, a hydraulic link acting on the float comprising a pipe having an inlet from the weir box at substantially the level of the weir and discharging into the feed control pot, and means affording an outlet from the pot through a plurality of vertically spaced orifices.

12. In a device of the character described, a treatment tank, a heating tank, a discharge passage from the heating tank to the treatment tank, a sealed weir box for supplying liquid to the heating tank, a chemical supply, mechanism for feeding chemical therefrom to the treatment tank, a pot disposed at a lower level than the weir box, a float in the pot operatively connected to the chemical feeding mechanism, a hydraulic link acting on the float and comprising a pipe having an inlet from the weir box at substantially the level of the weir and discharging into the pot means providing an outlet from the pot through a plurality of vertically spaced orifices, said orifices being so spaced and gaged that the head of liquid within the pot will bear a predetermined ratio to the head of liquid in the weir box.

13. In apparatus of the class described, the combination of means for supplying liquid for treatment, dosing mechanism effective continuously to control supply of treating material for such liquid, means for diverting a constant proportion of the liquid as it is supplied for treatment, a hydraulic link for transmitting said diverted portion of the liquid, and means proportionately responsive to variations in the head of liquid in course of transmission through the link for governing the dosing mechanism.

14. In apparatus of the class described, the combination with means for supplying liquid for treatment, of means for diverting a constant proportion of such liquid as it is supplied, a receptacle arranged to accommodate simultaneous inflow and outflow of such diverted liquid, dosing means for supplying treating material to the liquid to be treated, and means associated with said receptacle for governing said dosing mechanism, said last mentioned means being responsive to increases and decreases in the head of liquid in said receptacle.

15. In apparatus of the class described, the combination with means for supplying liquid for treatment, of dosing means for continuously supplying treating material for such liquid, measuring means effective on said dosing means to vary the volume of material supplied thereby, means for diverting a constant proportion of the liquid supplied for treatment, a hydraulic link accommodating continuous discharge of the diverted liquid, and mechanism controlled by liquid in said link and continuously effective on the measuring means to govern the supply of treating material.

16. In apparatus of the class described, the combination with means for supplying liquid for treatment, of means for diverting a proportion of the liquid supplied, a hydraulic link arranged to transmit the diverted liquid and to accommodate continuous discharge thereof, and feeding mechanism controlled from said link, the outlet of said link being arranged to vary the volume of instant discharge therefrom in varying proportion to variations in the quantity of liquid diverted.

17. In mechanism of the class described the combination of a treating receptacle, a container for treating material, means for supplying liquid for treatment in said treating receptacle, mechanism for measuring treating material out of said container, proportioning means associated with said treating receptacle for diverting a proportion of the liquid supplied for treatment, regulating receptacle associated with the measuring mechanism, a conduit for transmitting the diverted liquid from said proportioning means to said receptacle, said regulating receptacle having an outlet affording continuous discharge of liquid supplied thereto, and mechanism responsive to variations in the head of liquid in the regulating receptacle for controlling the measuring mechanism.

18. In apparatus of the class described the combination of a treating receptacle, means for supplying liquid thereto for treatment, a chemical tank adapted for the preparation of treating material therein, measuring mechanism for continuously governing discharge of material from said tank, means for diverting liquid from the supply in proportion to the volume supplied for treatment, a hydraulic link adapted to accommodate continuous transmission and discharge of such diverted liquid, and means responsive to variations in the quantity of liquid in said link for controlling the measuring mechanism.

19. In apparatus of the class described, the combination with means for supplying liquid for treatment, of dosing mechanism for supplying treating material thereto, means for diverting a portion of the liquid supplied for treatment, a hydraulic link for transmitting the diverted liquid, said link including a discharge portion affording discharge apertures arranged at different heights, and means responsive to variations in the quantity of liquid in said link for controlling said dosing mechanism.

In testimony whereof I have hereunto signed my name in the presence of two subscribing witnesses.

WALTER WAGNER.

Witnesses:
 WALTER H. GREEN,
 P. N. ENGEL.